US012683996B2

(12) United States Patent
Callahan et al.

(10) Patent No.: US 12,683,996 B2
(45) Date of Patent: Jul. 14, 2026

(54) SYSTEMS AND METHODS FOR DETECTING DATA LEAKAGE OF ONLINE CONTENT

(71) Applicant: Ad Lightning Inc., Seattle, WA (US)

(72) Inventors: Drake Callahan, Seattle, WA (US); Doug Britsch, Seattle, WA (US)

(73) Assignee: Ad Lightning Inc., Seattle, WA (US)

( * ) Notice: Subject to any disclaimer, the term of this patent is extended or adjusted under 35 U.S.C. 154(b) by 580 days.

(21) Appl. No.: 17/756,113

(22) PCT Filed: Nov. 20, 2020

(86) PCT No.: PCT/US2020/070809
§ 371 (c)(1),
(2) Date: May 17, 2022

(87) PCT Pub. No.: WO2021/102470
PCT Pub. Date: May 27, 2021

(65) Prior Publication Data
US 2023/0017558 A1     Jan. 19, 2023

Related U.S. Application Data

(60) Provisional application No. 62/938,723, filed on Nov. 21, 2019.

(51) Int. Cl.
*H04L 9/40* (2022.01)
(52) U.S. Cl.
CPC ................................. *H04L 63/1433* (2013.01)
(58) Field of Classification Search
CPC . H04L 63/1433; H04L 63/306; H04L 67/306; H04L 67/02
See application file for complete search history.

(56) References Cited

U.S. PATENT DOCUMENTS

| | | | |
|---|---|---|---|
| 9,003,423 | B1 | 4/2015 | Rodriguez Valadez et al. |
| 9,009,821 | B2 | 4/2015 | Podjarny et al. |
| 9,218,267 | B1 | 12/2015 | Keller |

(Continued)

FOREIGN PATENT DOCUMENTS

| | | |
|---|---|---|
| WO | 2019020812 A1 | 1/2019 |
| WO | 2021102470 | 5/2021 |

OTHER PUBLICATIONS

AutoBLG: Automatic URL Blacklist Generator Using Search Space Expansion and Filters 20th IEEE Symposium on Computers and Communication (ISCC) pp. 625-631 (Year: 2015).

(Continued)

*Primary Examiner* — Blake I Narramore
(74) *Attorney, Agent, or Firm* — FORTEM IP LLP

(57) ABSTRACT

In some embodiments, a method for monitoring and/or inhibiting data leakage comprises generating a plurality of first and second profiles, and providing the first profiles to a predetermined website, and providing data associated with the exposure of the first profiles to one or more intermediaries. The method further comprises exposing the first and second profiles to third-party websites such that the content of the third-party websites is received by the first and second profiles, and retrieving information corresponding to the content received by the first and second profiles via at least one of the one or more intermediaries.

22 Claims, 10 Drawing Sheets

(56) References Cited

U.S. PATENT DOCUMENTS

| | | | |
|---|---|---|---|
| 9,843,447 B1 | 12/2017 | Bishop et al. | |
| 10,482,239 B1 | 11/2019 | Liu et al. | |
| 10,826,936 B2 | 11/2020 | Callahan et al. | |
| 11,132,717 B2 | 9/2021 | Kosai et al. | |
| 11,368,435 B2 | 6/2022 | Revashetti et al. | |
| 11,568,448 B2 | 1/2023 | Kosai et al. | |
| 11,683,342 B2 | 6/2023 | Callahan et al. | |
| 2007/0112678 A1 | 5/2007 | Himelfarb | |
| 2008/0091524 A1 | 4/2008 | Yan et al. | |
| 2009/0099920 A1 | 4/2009 | Aharoni et al. | |
| 2009/0307056 A1 | 12/2009 | Park et al. | |
| 2011/0035486 A1 | 2/2011 | Seolas et al. | |
| 2011/0213678 A1 | 9/2011 | Chorney | |
| 2012/0158509 A1 | 6/2012 | Zivkovic et al. | |
| 2012/0290622 A1 | 11/2012 | Kumar et al. | |
| 2013/0066708 A1 | 3/2013 | Riley | |
| 2013/0124300 A1 | 5/2013 | Hopwood | |
| 2013/0179109 A1 | 7/2013 | Buckhurst et al. | |
| 2013/0212638 A1 | 8/2013 | Wilson | |
| 2015/0006384 A1 | 1/2015 | Shaikh | |
| 2015/0082426 A1* | 3/2015 | Palan | G06Q 30/02 726/22 |
| 2015/0156084 A1 | 6/2015 | Kaminsky et al. | |
| 2015/0312263 A1 | 10/2015 | Bhamidipati et al. | |
| 2015/0326608 A1 | 11/2015 | Shabtai et al. | |
| 2016/0063568 A1 | 3/2016 | Brill et al. | |
| 2016/0180377 A1 | 6/2016 | Kang et al. | |
| 2016/0197948 A1* | 7/2016 | Im | H04L 63/1425 726/23 |
| 2016/0261623 A1 | 9/2016 | Mcclintock et al. | |
| 2017/0004221 A1 | 1/2017 | Olsen | |
| 2017/0054739 A1 | 2/2017 | Wardman et al. | |
| 2017/0068964 A1 | 3/2017 | Gevka et al. | |
| 2017/0091351 A1 | 3/2017 | Namer et al. | |
| 2017/0149817 A1 | 5/2017 | Sharifi Mehr et al. | |
| 2017/0243238 A1* | 8/2017 | Kosai | G06Q 30/0277 |
| 2017/0346853 A1* | 11/2017 | Wyatt | H04L 43/12 |
| 2018/0012256 A1 | 1/2018 | Napchi et al. | |
| 2018/0096417 A1* | 4/2018 | Cook | G06N 5/01 |
| 2018/0349614 A1* | 12/2018 | Ionescu | G06F 21/577 |
| 2018/0375892 A1* | 12/2018 | Ganor | G06Q 10/0635 |
| 2019/0222597 A1* | 7/2019 | Crabtree | H04L 63/1425 |
| 2019/0245894 A1* | 8/2019 | Epple | H04L 63/1483 |
| 2021/0044619 A1 | 2/2021 | Callahan et al. | |
| 2021/0084057 A1* | 3/2021 | Chhabra | H04L 63/1416 |
| 2021/0383435 A1 | 12/2021 | Kosai et al. | |
| 2022/0141297 A1 | 5/2022 | Hall et al. | |
| 2022/0164459 A1 | 5/2022 | Callahan et al. | |
| 2023/0111415 A1 | 4/2023 | Kosai et al. | |

OTHER PUBLICATIONS

How Retailers Can Optimize Campaigns With Dynamic Search Ads https://www.cpcstrategy.com/blog/2015/08/dynamic-search-ads/ (Year: 2015.

Su et al. , "De-anonymizing Web Browsing Data with Social Networks", Proceedings of the 26th International Conference on www. pp. 12610-1269. (Year: 2017).

United States Patent and Trademark Office, International Search Report and Written Opinion for PCT/US2020/070809, issued Feb. 9, 2021, 15 pages.

* cited by examiner

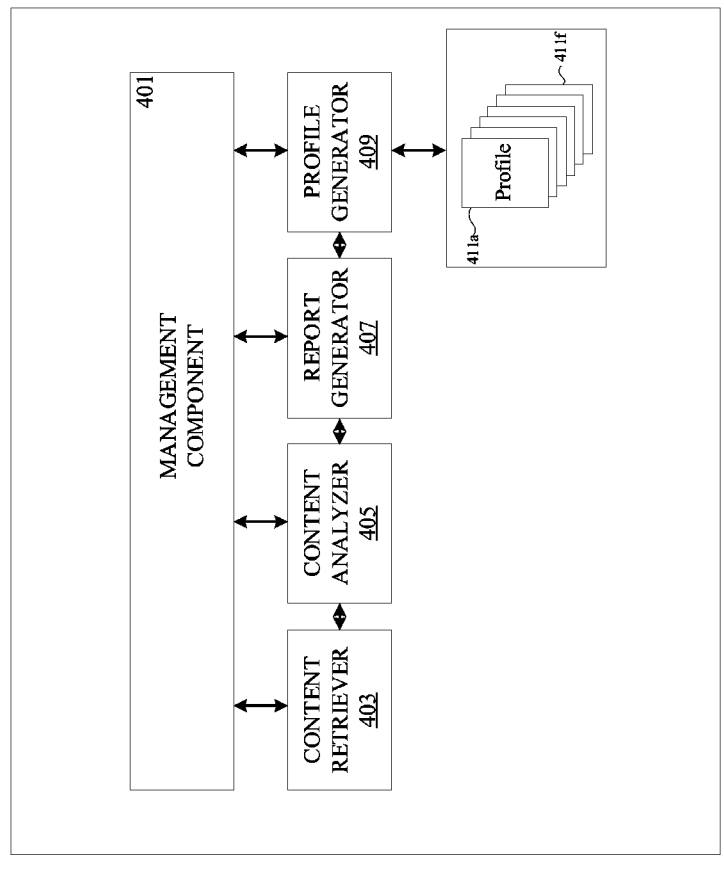
*FIG. 4*

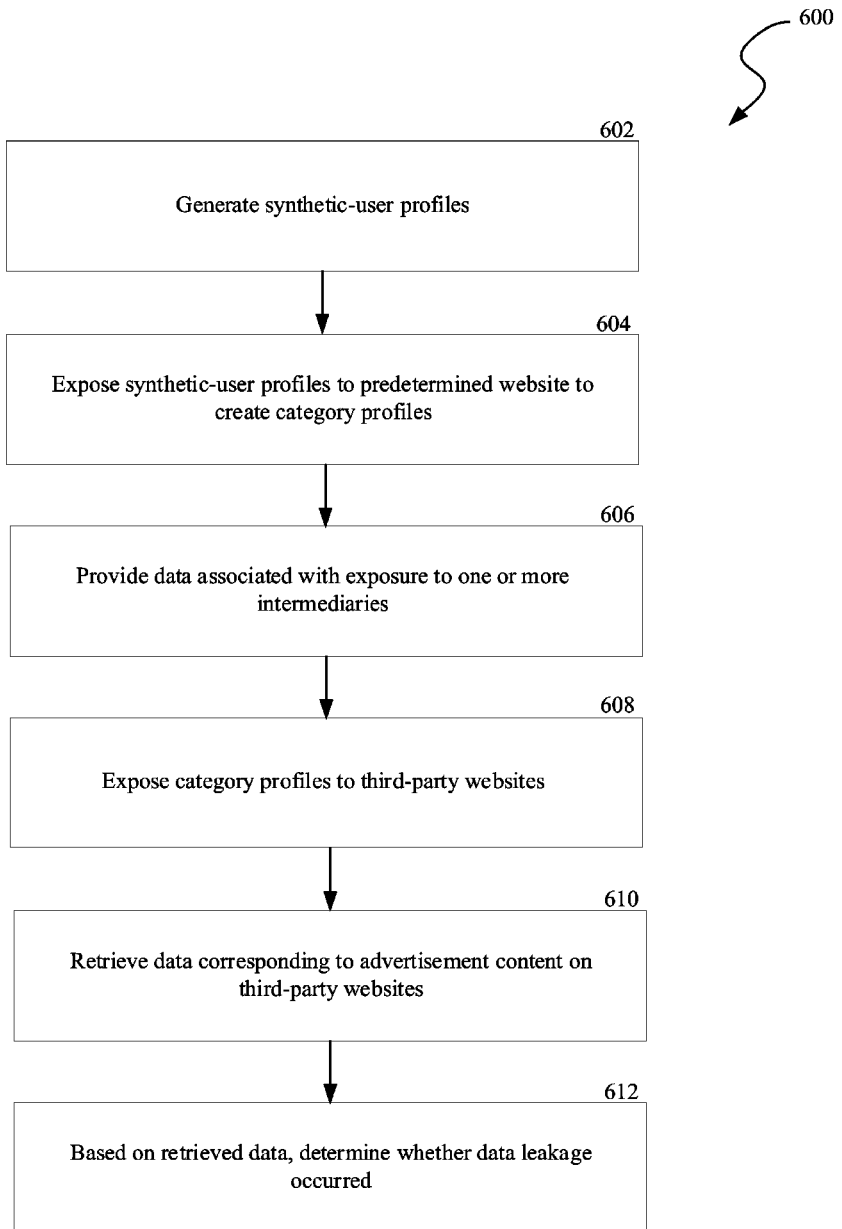

600

602

Generate synthetic-user profiles

604

Expose synthetic-user profiles to predetermined website to create category profiles

606

Provide data associated with exposure to one or more intermediaries

608

Expose category profiles to third-party websites

610

Retrieve data corresponding to advertisement content on third-party websites

612

Based on retrieved data, determine whether data leakage occurred

*FIG. 6*

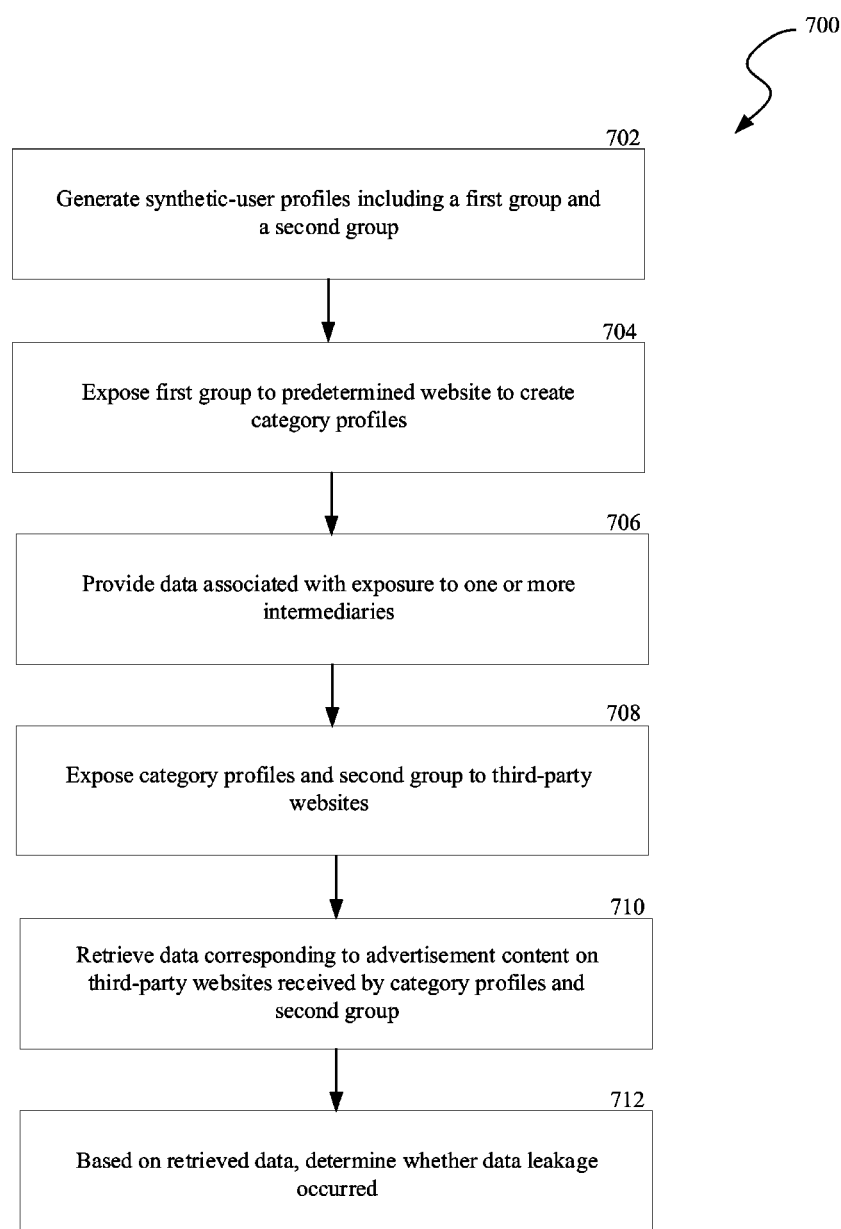

700

702

Generate synthetic-user profiles including a first group and a second group

704

Expose first group to predetermined website to create category profiles

706

Provide data associated with exposure to one or more intermediaries

708

Expose category profiles and second group to third-party websites

710

Retrieve data corresponding to advertisement content on third-party websites received by category profiles and second group

712

Based on retrieved data, determine whether data leakage occurred

| CATEGORY | CONTROL | MEASUREMENT | CHANGE |
|---|---|---|---|
| 818 → | 814 → | 816 → | 820 → |
| ˅  ★ Auto | 9% | 46% | 511% ↑ |
| ☐  ★ Ford | 1% | 12% | 1200% ↑ |
| ☐  Kia | 1% | 9% | 900% ↑ |
| ☐  Chevrolet | 2% | 8% | 400% ↑ |
| ☐  Toyota | 1% | 7% | 700% ↑ |
| ☐  Dodge | 1% | 4% | 400% ↑ |
| ☐  Nissan | 3% | 6% | 200% ↑ |
| ˄  Insurance | 11% | 29% | 263% ↑ |
| ˄  E-Commerce | 8% | 3% | 63% ↓ |
| ˄  Telecom | 12% | 4% | 67% ↓ |
| ˄  Tech | 18% | 5% | 72% ↓ |
| ˄  Travel | 19% | 6% | 68% ↓ |
| ˄  CPG | 23% | 7% | 70% ↓ |

Cohort Definition | Data Leakage Scorecard | Data Leakage Forensics | Alerts & Blockings Account    Settings    Sign out

*FIG. 8C*

SYSTEMS AND METHODS FOR DETECTING DATA LEAKAGE OF ONLINE CONTENT

CROSS-REFERENCE TO RELATED APPLICATIONS

The present application is a 371 U.S. national phase application of International Application No. PCT/US2020/070809, filed Nov. 20, 2020, which claims the benefit of priority of U.S. Patent Application No. 62/938,723, filed Nov. 21, 2019, the disclosures of which are incorporated by reference herein in their entireties. The disclosures of U.S. patent application Ser. Nos. 15/439,475, 15/439,351, and 16/402,878 are herein incorporated by reference in their entireties.

TECHNICAL FIELD

The present technology relates to systems and methods for detecting data leakage of online content.

BACKGROUND

Online content providers often engage third-party affiliates to present content on the websites of other content providers. For example, the host of a successful website may receive a high number of page views per month, thereby creating a desirable platform for presenting content. Online technology enables targeted advertisement content based on a visitor's browsing history. However, successful content providers rarely desire to dedicate resources to the task of managing a targeted advertising platform. Accordingly, the affiliates are engaged to acquire, curate and manage the content that is ultimately displayed on the content provider's website. Such arrangements, however, can present problems for the content providers. For example, the affiliates may serve content that is inconsistent with the content provider's desire, or that is poorly implemented such that the content hampers the performance of the content provider's website. Additionally, the affiliates may compromise data of the content providers and indirectly frustrate the advertising efforts of the content providers. Currently, there is no efficient tool for detecting and/or discouraging such problems related to online advertisements. Accordingly, there is a need for improved method and/or system for detecting such problems.

BRIEF DESCRIPTION OF THE DRAWINGS

Many aspects of the present disclosure can be better understood with reference to the following drawings.

FIG. 4 is a schematic block diagram of a content monitor for generating synthetic-user profiles, in accordance with embodiments of the present technology.

FIGS. 6 and 7 are flow diagrams illustrating processes for detecting and/or inhibiting data leakage related to online content, in accordance with embodiments of the present technology.

FIGS. 8A-8C are illustrations of user interfaces, in accordance with embodiments of the present technology.

Figure 1:
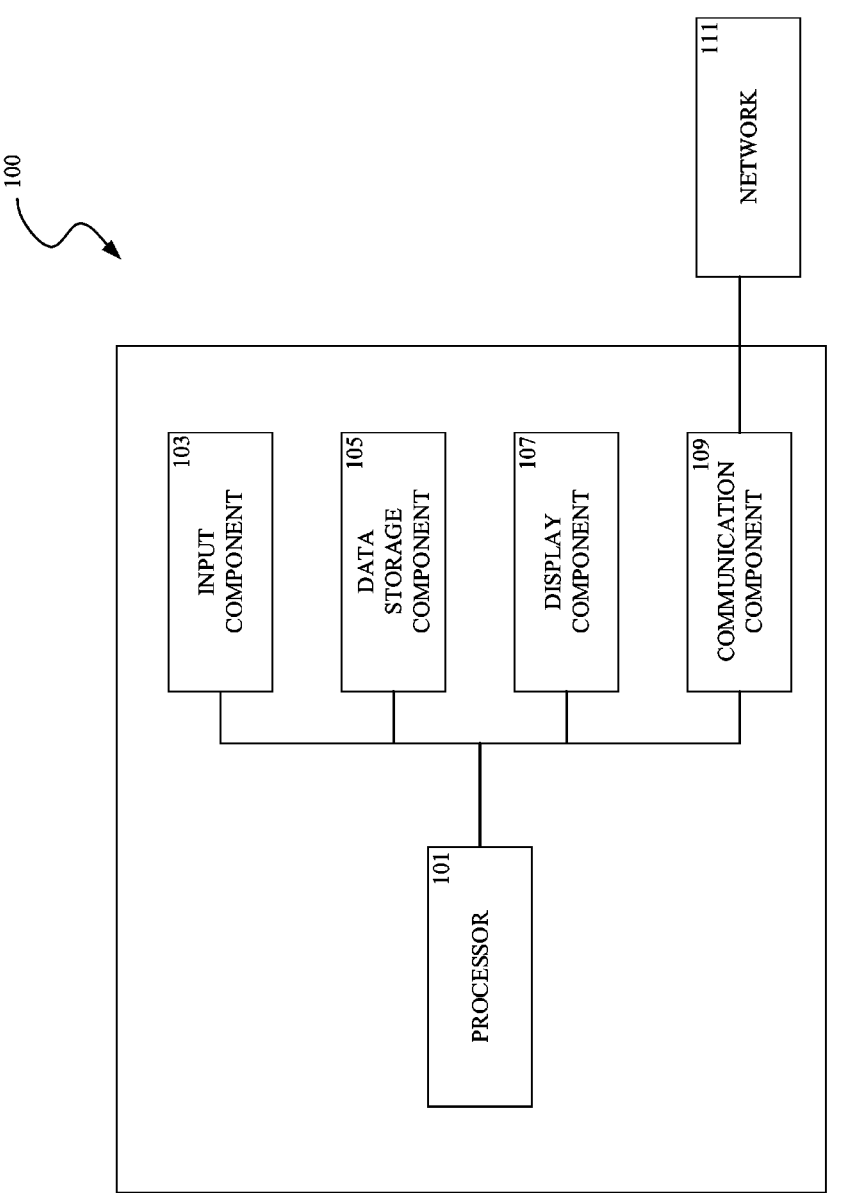
FIG. 1 is a schematic block diagram of a computing device in which a system for detecting and/or inhibiting data leakage related to online content may operate, in accordance with embodiments of the present disclosure.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Online targeted advertising directs advertising content to users based on their previous browsing history, and is one of the most effective and commonly used methods used for advertising purposes. As an example of targeted advertising, a user interested in purchasing a new vehicle may visit the website of car company A. In doing so, company A is able to capture data (referred to herein as "first party data") from the user's interaction with the website, indicating that this particular user may be interested the goods or services of company A. As a result, in the following hours, days, or weeks, company A may attempt to target the user with its advertisement content when the user visits other websites that have advertisement slots thereon. In order to do this on a large scale, company A typically will engage with an advertising affiliate, such as an intermediary (e.g., an advertisement agency, advertisement network, advertisement exchange, etc.) that uses data transfer techniques (e.g., advertisement calls, pixel calls, redirects, server-to-server syncs, cookie syncs, etc.) to target that user with the advertisement content of company A. In doing so, company A must share its first party data with the intermediary to identify the user it would like to target with its advertisement content. Generally speaking, the intermediary will attempt to buy an advertisement slot or an inventory of advertisement slots from a content provider's webpage such that the intermediary can target the webpage's visitor(s) with its advertisement content, e.g., on behalf of company A or other content providers. For example, when the user visits another website (e.g., a news website) having an advertisement slot thereon, the intermediary can arrange, e.g., via its relationship with other intermediaries or content providers, to fill that slot with advertisement content from company A. However, in addition to or in lieu of providing company A's first party data to the news website, the intermediary may arrange to (i) provide advertisement content of company A's competitors or other content providers interested in the user's interaction with company A's website, or (ii) sell the first party data to one or more other intermediaries affiliated with company A's competitors. These competitors, other content providers, or other intermediaries also want to target the user with their advertisement content. Moreover, because the user is interested in the goods and services associated with these third parties, as the first party data indicates, one or more of them will likely be willing to pay a premium for the first party data. For these and other reasons, the first party data is often leaked to one or more of the third parties, which can facilitate "media arbitrage." Due to media arbitrage, the effectiveness of targeted advertising is decreased for companies like company A and, as a result, the advertising costs for company A increase since it now needs to conduct additional marketing.

Embodiments of the present technology address at least some of the above described issues by providing a platform able to monitor and/or inhibit data leakage related to online content. As explained in more detail elsewhere herein, embodiments of the present disclosure are directed to systems and associated methods that comprise generating a plurality of profiles, only some of which are exposed or directed to a predetermined website. The first and second profiles or groups of profiles can be synthetic profiles that can include simulated browsing histories and thus emulate actual website visitors. The predetermined website can be characterized as being within or part of a particular content category (e.g., auto, insurance, travel, etc.). The method further includes providing data associated with the exposure of the first profiles to one or more intermediaries, and then providing or exposing the second profiles to third-party websites. The third-party websites can be any website (i) hosted by an affiliated server that is different than the affiliated server hosting the predetermined website and (ii) not characterized within the same content category as the predetermined website. By providing the second profiles to the third-party websites, the dynamic content (e.g., advertisement content) of the third-party websites is received by the second profiles. The method further includes retrieving information corresponding to the content received by the second profiles via at least one of the one or more intermediaries. Specific details of several embodiments of the technology are described below with reference to FIGS. 1-8C.

While some examples described herein may refer to functions performed by given actors such as "users," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 101 is first introduced and discussed with reference to FIG. 1, and element 503 is first introduced and discussed with reference to FIG. 5. Many of the details and other features shown in the Figures are merely illustrative of particular embodiments of the disclosed technology. Accordingly, other embodiments can have other details and features without departing from the spirit or scope of the disclosure. In addition, those of ordinary skill in the art will appreciate that further embodiments of the various disclosed technologies can be practiced without several of the details described below.

II. Suitable Operating Environment

FIG. 1 is a schematic block diagram of a computing device 100 in which a system for detecting and/or inhibiting data leakage related to online content may operate, in accordance with embodiments of the present disclosure. As shown in FIG. 1, the computing device 100 includes a processor 101, an input component 103, a data storage component 105, an output component 107, and a communication component 109. The processor 101 is configured to couple with and control other components in the computing device 100. The computing device 100 can communicate with other systems (e.g., Web servers or other devices) through the communication component 109 via a network 111. In some embodiments, the computing device 100 can communicate with additional devices (e.g., printers, tactile output devices, etc.) through the communication component

109. Network 111 can be any private or public network, such as the Internet, a corporate intranet, a wireless communication network, or a wired communication network.

The input component 103 is configured to receive an input (e.g., an instruction or a command) from a device user. The input component 103 can include a keyboard, a mouse, a touch pad, a touchscreen, a microphone, a joystick, a pen, a game pad, a scanner, a camera, and/or the like. The data storage component 105 can include any type of computer-readable media that can store data accessible to the processor 101. In some embodiments, the data storage component 105 can include random-access memories (RAMs), read-only memories (ROMs), flash memory cards, magnetic hard drives, optical disc drives, digital video discs (DVDs), cartridges, smart cards, etc.

The output component 107 is configured to output information to the device user. In some embodiments, the output component 107 can include one or more display (e.g., flat panel displays such as liquid crystal displays (LCDs), light emission diode (LED) displays, plasma display panels (PDPs), electro-luminescence displays (ELDs), vacuum fluorescence displays (VPDs), field emission displays (FEDs), organic light emission diode (OLED) displays, surface conduction electron emitter displays (SEDs), or carbon nano-tube (CNT) displays). In some embodiments, the output component 107 can include an audio transducer such as a speaker configured to output audible information to the device user.

A person of ordinary skill in the art will recognize that not all of the components of FIG. 1 are necessary to conduct embodiments of the present disclosure. For example, a computing device having the processor 101, data storage component 105, and communication component 109 may suffice.

Figure 2:
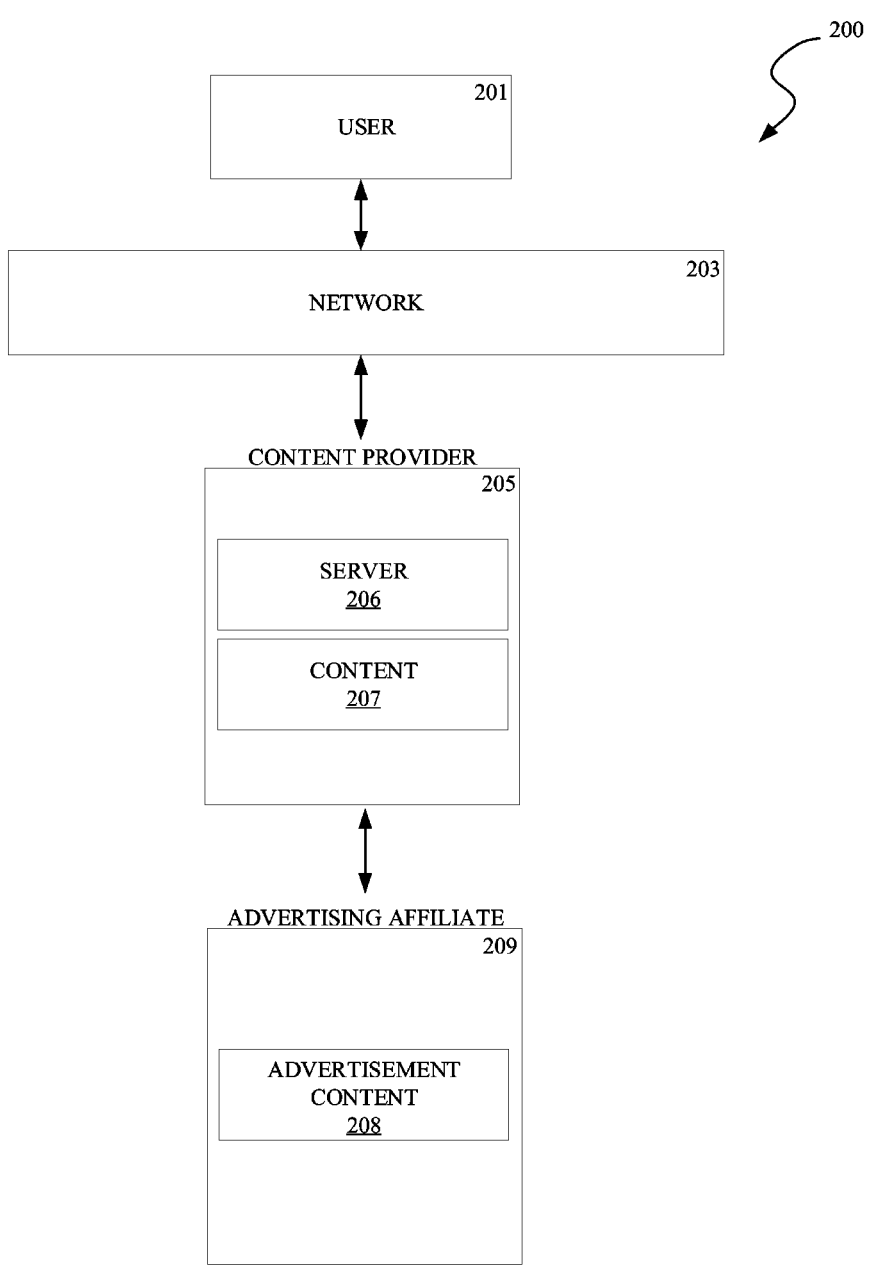
FIG. 2 is a schematic block diagram of a system for detecting online advertisement content, in accordance with embodiments of the present disclosure.

FIG. 2 is a schematic block diagram of a system 200 for monitoring online advertisement content, in accordance with embodiments of the present disclosure. As shown in FIG. 2, the system 200 includes a content provider 205, an advertising affiliate 209 in communication with the content provider 205, and a network 203 in direct or indirect communication with each of the content provider 205 and advertising affiliate 209. The content provider 205 can include a web server 206 for providing content 207 to a user or visitor 201 via the network 203. The content 207 can include static or dynamic webpages that utilize coding languages (e.g., HTML, PHP, Perl CGL, ASP, etc.) and that have advertisement content. The content 207 can be provided via the content provider 205 or the advertising affiliate 209, as discussed in more detail elsewhere herein. The user 201 can be associated with one or more computing devices, e.g., the device 100 (FIG. 1), that host user-specific data or information (e.g., cookies).

The advertising affiliate 209 can be configured to provide targeted or context-determined dynamic content (e.g., advertisement content) 210 in conjunction with other content provided by the content provider 205. The advertisement content 210 to be provided to the content provider 205 can be selected from a database of available advertisement content, which is commonly provided via various advertisers or content providers along with information regarding the target audience.

In operation, when a user 201 visits or requests to visit a webpage hosted on the server 206 of a content provider 205, the advertising affiliate 209 can determines the particular advertisement content 210 to be provided in conjunction with the other content of the webpage. In some embodiments, the advertisement content 210 provided for a particular user is based at least in part on a profile or browsing history of that user 201. For example, if the user previously visited a webpage of a first content provider, the first content provider may provide persistent data to be associated with that user (e.g., cookies stored by the user's browser), which may be utilized by the advertising affiliate such that the advertising affiliate 209 can target that user on the first content provider's behalf.

Figure 3:
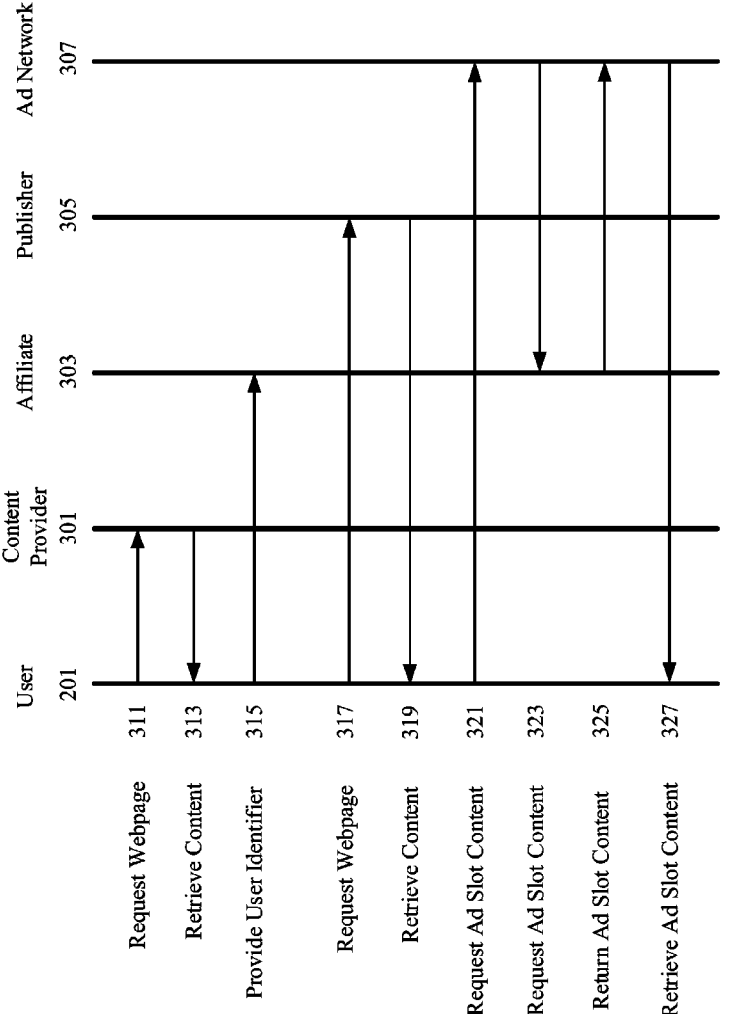
FIG. 3 is a schematic diagram illustrating content distribution amongst various parties in an online environment, in accordance with embodiments of the present disclosure.

FIG. 3 is a schematic diagram illustrating content distribution amongst various parties in an online environment, in accordance with embodiments of the present disclosure. As shown in FIG. 3, the user 201 can initiate a request to a webpage of a content provider 301 (line 311), and in response the content provider 301, or server hosting the content provider's webpage, can provide content to the user (line 313) to enable assembly of a dynamic webpage. The content provider can correspond to the content provider 205 (FIG. 2) previously described, and/or any server or webpage affiliated with a party or company offering goods and services (e.g., an automotive or hospitality company). The content provided via line 313 can include non-advertisement content, and in some embodiments may only include non-advertisement content. Additionally or alternatively, the content provided via line 313 can include one or more cookies or other information to identify the user 201, and advertisement configuration protocol, e.g., for determining how and what advertisement content is displayed on the retrieved webpage from the content provider 301. After requesting the webpage via line 311, the cookie or other identifying information of the user 201 may be provided to and/or requested from an affiliate 303 (line 315). The cookie or other identifying information can include data corresponding to the user's previous visit to the content provider 301 which, as explained in detail elsewhere herein, may be later used by the affiliate 303 to retrieve advertisement content specifically for the user 201. The affiliate 303 can correspond to the advertising affiliate 209 (FIG. 2) previously described, and/or an external provider or intermediary, as explained in detail elsewhere herein (e.g., with reference to FIG. 5).

After or simultaneous to the cookie or other identifying information of the user 201 being provided to the affiliate 303 via line 315, the user 201 may initiate a request to a webpage of a publisher 305 (line 317). The publisher 305 can correspond to any webpage (e.g., a news or sports webpage) that has an advertisement slot to be filled with advertisement content. In response to the user's request via line 317, the publisher 305, or server hosting the publisher's webpage, provides content to the user 201 (line 319) to enable assembly of a dynamic webpage. After or simultaneous to requesting the webpage from the user 201 via line 317, the user 201 may also request advertisement content for the advertisement slot of the previously requested publisher's webpage (line 321). Such a request may be directed to an advertisement network 307. The advertisement network 307 may correspond to an intermediary (e.g., a different intermediary than the affiliate 303), as explained elsewhere herein. In response to receiving the request from the user 201, the advertisement network 307 may request advertisement content from the affiliate 303 (line 323), which in turn may return advertisement content (e.g., advertisement content 210; FIG. 2) to the advertisement network 307 (line 325). The advertisement content returned to the advertisement network 307 may be based on the cookie or other identifying information of the user provided to the affiliate 303 via line 315. As a result, and as explained in more detail elsewhere herein, the advertisement content returned to the advertisement network 307 may be content from the content provider 301 or content affiliated with the content provider's direct or indirect competitors. The advertisement content for the advertisement slot returned to the advertisement network 307 can be retrieved by the user 201 (line 327) and thereby fill the advertisement slot on the publisher's webpage.

FIG. 4 is a schematic block diagram of a content monitor 400, in accordance with embodiments of the present technology. The content monitor 400 can be configured to evaluate online advertisement content, and/or manage a process for measuring the quality and/or performance of online advertisement content. As shown in FIG. 4, the content monitor 400 can include a management component 401, a content retriever 403, a content analyzer 405, a report generator 407, and a profile generator 409.

The management component 401 can be configured to facilitate inter-process cooperation and operation between the individual components of the content monitor 400. Additionally or alternatively, the management component 401 may include logic to schedule and/or marshal various events and tasks amongst the individual components. Each of the content retriever 403, content analyzer 405, report generator 407, and profile generator 409 can be in direct or indirect communication with one another and the management component 401. The content monitor 400 can be configured to communicate with disparate computing devices, e.g., over a local or wide area network. For example, the content monitor 400 can communicate with a remote content provider, e.g., as disclosed elsewhere herein.

The content retriever 403 can be configured to retrieve content from specified websites and/or webpages. The content retriever 403 can visit one or more webpages, e.g., on behalf of the content provider 205 (FIG. 2), for evaluating content (e.g., advertisement content provided by an advertising affiliate 209 (FIG. 2). For example, in some embodiments, the content retriever 403 may sample the content provider's website to retrieve advertisement content therefrom. The sampling may occur by actually visiting the content provider's website, e.g., via a web browser that has a native profile or measurement tools, and/or by invoking profiles (e.g., synthetic profiles) to simulate visiting the content provider's website by an actual user. Any retrieved content from the content retriever 403 can be provided to the content analyzer 405.

The content analyzer 405 is configured to perform an analysis of the quality of at least a portion of the retrieved content, e.g., from the content retriever 403. For example, the content analyzer 405 can analyze the external content (e.g., the advertisement content) from the content provider's website that was provided from the advertising affiliate. As another example, the content analyzer 405 can analyze advertisement content or other resources (e.g., multimedia content) provided by the content provider itself. Various types of analyses can be performed on the retrieved content, which may be used to determine a quality score for the retrieved content. The quality score can correspond to, e.g., the appropriateness of the content for a particular user profile. That is, the quality score may serve as a measure of the effectiveness the content would have on an actual user having that particular user profile. Additionally, the quality score may be based on the following criteria:

1. CPU Time—A CPU time metric may be computed by producing an aggregate total (or other summary statistic) using measurements of the advertisement content. The measurements may be provided natively by the web browser, or determined by other code profiling mechanisms. The profiling mechanisms can include one or more of (i) the wall clock time of individual function calls comprising loads for the advertisement content, (ii) the thread clock time of individual function calls comprising the loads, or (iii) the longest non-yielding call, with respect to either wall clock time or thread clock time.

2. Network Transfer Data—A network transfer data metric may be computed by producing an aggregate total (or other summary statistic) of the data transferred over the network. Additionally, the network transfer data metric can also be computer by measuring the distribution of the number of (i) bytes in a network request or response, (ii) resource requests made, (iii) resource requests fetched from the browser cache instead of the network, or (iv) resource requests resulting in errors (either in aggregate, or by error code), may be used as an additional metric.

3. Animation Load—An animation load metric may be computed based on the total number of compositing or paint events either as a direct measurement or as a proxy for CPU time. This number can be based on one or both of high-frequency repaint events and CSS animation frames, occurring either in the browser's main thread or in a separate compositing or rendering thread.

4. Tracker Load—A tracker load metric may be computed based on the number of "tracking pixels" or likely tracking scripts. In one implementation, this value may be produced by counting the number of resource requests determined to be likely trackers. Identification of trackers may be rule-based or statistical, and may be performed using either individual, or weighted combinations of rules. Illustrative rules that may be implemented may be based on mime types or file extensions identifying an asset as an image, missing mime types, plain text responses, small response payload sizes, response payload sizes matching exactly "known values" for tracking pixels, or the like.

5. Rich Media—A rich media score may be quantified to estimate the presence of rich media. This score may be determined via (i) static analysis of the advertisement content, (ii) inspecting the file type or size of downloaded assets, and/or (iii) inspecting measurements.

6. Secured Resource Requests—A secured resource metric may be quantified based on the number or proportion of secured requests (e.g., SSL-enabled requests). Non-encrypted advertisement resources are not eligible for HTTP2 and may actually be a detriment to performance.

7. Malware Detection—A malware scoring criterion may be computed based on an analysis of the analyzed portion for the presence of malicious code, such as "malware," spyware," "adware," or the like.

Based on at least some of the above-described criteria, the content analyzer 405 can generate the quality score that represents a quality value for the content. In some embodiments, the quality score can be a plurality of individual scores, a combination of individual scores of one or more of the foregoing evaluations, a weighted (e.g., equally weighted or non-equally weighted) average of two or more of the foregoing evaluations, or any combination thereof. Additionally or alternatively, the process for generating the quality score can utilize a rules-based engine, a statistical method, a predictive model, or a combination thereof.

Once the quality score for a particular piece of advertisement content has been generated, the quality score can be communicated to the report generator 407. As previously described, the report generator 407 can generate a response based on the quality score and criteria provided by the content provider and/or retrieved via the content retriever 403. The response may take a number of different forms. In some embodiments the report generator 407 formulates a report based on the "quality" of advertisement content served in conjunction with the content provider's content. For example, the report generator 407 may compare the quality score for one or more pieces of advertisement content against a given criteria. Any advertisement content which does not satisfy (e.g., is above or below) the given criteria are reported as being "bad." Failing the given criteria may be the result of a single metric falling below said criteria, a plurality of metrics falling below multiple criteria, or one or more metrics falling below an average or weighted average of the criteria.

The report generator 407 is configured to generate one or more reports based on the evaluation of the advertisement content. For the advertisement content identified as bad, the report generator 407 may issue a corresponding notification either to the content provider 205 (FIG. 2), the advertising affiliate 209 (FIG. 2), another third party, or a combination thereof. The notification may take the form of an automated request to prevent any "bad" advertisement content from being served in conjunction with the content provider's website. In one specific implementation, such a request may take the form of an automated e-mail, a reporting webpage, an API call to the advertising affiliate, or the like. In some embodiments, a report may only be generated if the evaluated quality is above or below a predetermined threshold.

The profile generator 409 is configured to create and manage a plurality of synthetic-user profiles 411a-f (collectively referred to herein as "profiles 411"). Each of the profiles 411 can represent a fabricated browsing history of an imaginary user. In such embodiments, each of the profiles 411 is configured to simulate the browsing habits of a real person by performing a multiplicity of activities, e.g., browsing or searching the Internet. In doing so, a user having a particular browsing history, device configuration, browser software, and other associated data, can be generated and used to monitor and/or determine data leakage, as described elsewhere herein.

In operation, the content monitor 400 can perform multiple browsing sessions by visiting numerous websites. The profile generator 409 is configured to access each of the websites, e.g., using browsing software that accumulates user-specific data from each website. For example, the profile generator 409 may visit a first website including content pertaining to the automotive industry. By visiting this first website, the profile generator 409 accumulates the cookies and other user-specific data associated with the first website. Additionally, the profile generator 409 may visit a second website including content pertaining to a political party. By visiting this second website, the profile generator 409 accumulates the cookies and other user-specific data associated with the second website. The profile generator 409 can repeat this behavior, visiting websites. The profile generator 409 can repeat this behavior for numerous other websites having different and/or varying characteristics. As a result of visiting the websites, the profile generator 409 can accumulate user-specific data that corresponds to a particular browsing history or pattern, and that is stored as one of the profiles 411.

The profile generator 409 may repeat the foregoing operations to generate different user profiles. In some embodiments, the visited websites may be selected via a variety of methods, including random sampling of top websites. In addition to or in lieu of the foregoing, the visited websites may be selected to simulate the expected browsing habits of a target demographic. For example, the content monitor 400 may be tasked with creating one user profile simulating the browsing characteristics of a mature or elder adult, and another user profile simulating the browsing characteristics of a young adult. In such embodiments, different browsing criteria may be specified to generate different profiles. For example, the young adult may be more likely to visit a social network website and a multimedia website, whereas the mature adult may be more interested in an industry news website and a political blog. Accordingly, different profiles 411 may be generated by specifying different browsing patterns which the profile generator 409 may execute. In addition to varying the browsing history of various synthetic user-profiles, the profile generator 409 may vary other aspects of the profiles 411, such as device configuration (e.g., device ID), browser software (e.g., Chrome®, Internet Explorer®), geo-location data, time zone data, etc.

III. Example Systems and Methods for Monitoring, Detecting and/or Inhibiting Data Leakage Related to Online Content As previously described, leakage of first party data to third parties such as competitors of an original content provider or affiliates (e.g., intermediaries) of those competitors can decrease the effectiveness of targeted advertising and/or increase advertising costs for the original content provider. This issue of first party data leakage has yet to be solved in part because of the difficulty in identifying whether data leakage occurred, and if so the source of the data leakage, e.g., from an intermediary or collection of intermediaries. Stated differently, the original content provider (i.e., the owner of the first party data) is unable to determine whether its first party data has been improperly leaked and/or prove which intermediary or collection of intermediaries first leaked the first party data. Embodiments of the present disclosure address this issue by creating a data protection platform and/or processes that enable the original content provider to determine (i) whether first party data leakage is occurring, and (ii) if first party data leakage is occurring, which intermediary or collection of intermediaries is, at least in part, responsible for the leakage.

Figure 5:
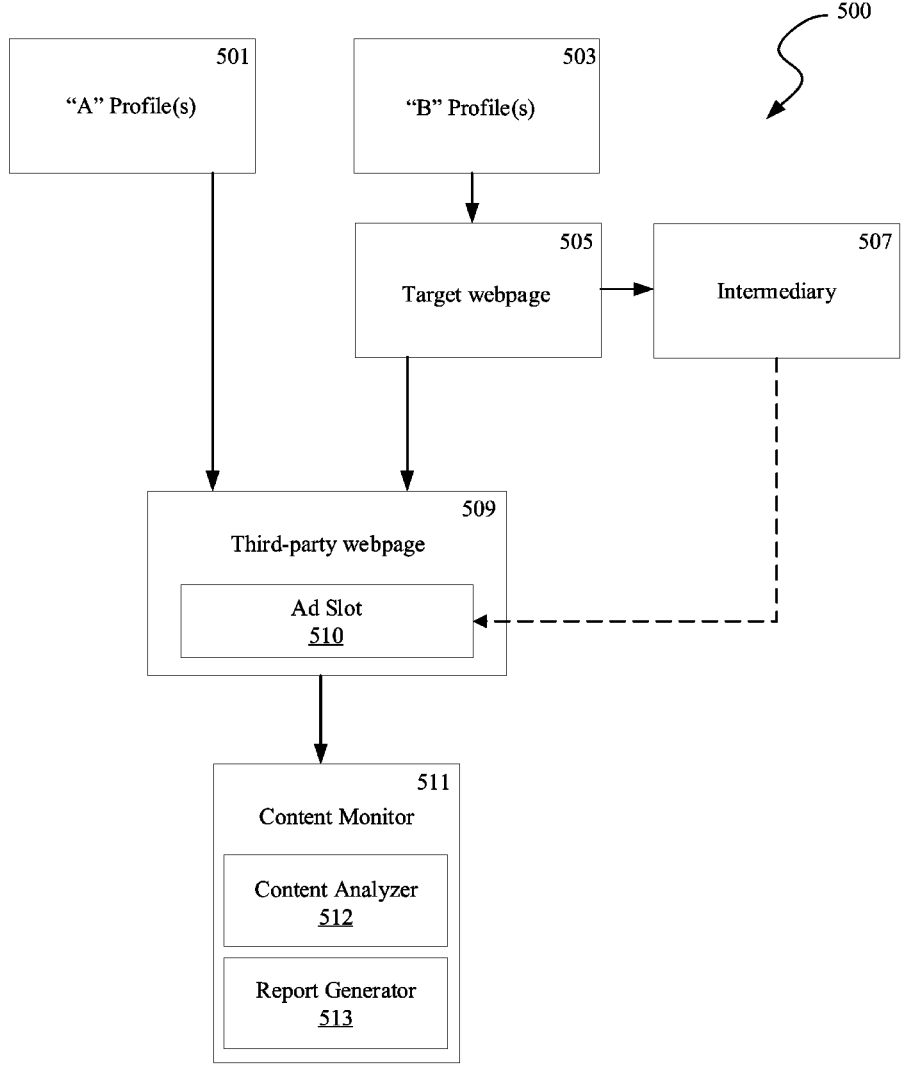
FIG. 5 is a functional block diagram of a system for detecting and/or inhibiting data leakage related to online content, in accordance with embodiments of the present technology.

FIG. 5 is a functional block diagram of a system 500 for detecting and/or inhibiting data leakage related to online content, in accordance with embodiments of the present technology. As shown in FIG. 5, the system 500 includes one or more A profiles 501 and B profiles 505. Each A profile 501 and B profile 505 can generally correspond to a synthetic-user profile, as discussed elsewhere herein, configured to emulate a target audience member (e.g., the user 201; FIG. 2) of a content provider (e.g., the content provider 205; FIG. 2). For example, the A profile may have a simulated browsing history that is pseudo-random and/or that represents a particular demographic (e.g., an adolescent adult). In various embodiments, the A and B profiles can be identical or substantially identical except for the exposure of the B profiles to certain target webpages, as described below. Although certain examples are described below with respect to single A and B profiles, in certain embodiments there may be several (e.g., dozens or more) of A and B profiles, each having different user characteristics (e.g., browser type, browsing history, demographic characteristics, etc.).

As shown in FIG. 5, the B profile 501 is provided (e.g., directed or exposed) to one or more target webpages 503 (referred to hereinafter as "target webpage 503. For purposes of this disclosure, the owner of the target webpage 503 is referred to as the original content provider. The target webpage 503 may be hosted by an affiliated server (e.g., server A) and/or owned by a company (e.g., company A) that generally operates within a particular category (e.g., auto, travel, healthcare, hospitality, insurance, telecommunications, food, beverage, retail, financial, etc.) of goods or services. As an example, for the auto category, the target webpage 503 can include one or more webpages associated with Ford®. By exposing the A profile to the target webpage 503 to generate the B profile, the original content provider obtains first party data corresponding to the B profile. Stated differently, the original content provider obtains first party data that identifies the B profile as a user that visited the target webpage 503 and is thus seemingly interested in the goods or services of the original content provider and/or the category the original content provider operates in. In some embodiments, the original content provider may obtain a unique identifier (e.g., a cookie) or combination of identifiers associated with the B profile. In certain embodiments, the original content may contribute additional data to the B profile that includes such a unique identifier or combination of identifiers, which may then permit a downstream third-party (e.g., an intermediary or advertising affiliate) to identify the B profile as one that has visited the target webpage 503. In some embodiments, the B profile's browsing history only includes a single target webpage 503 within the category of the original content provider. For example, for the auto category, the B profile may include browsing history for only a webpage associated with Ford® and no other browsing history associated with auto webpages. In such embodiments, generating the B profile 501 to only include browsing history of a single target webpage 503 within a category of interest ensures that the B profile 505 includes first party data for only the original content provider in that category. As explained in additional detail elsewhere herein, since the first party data may eventually be shared with one or more intermediaries affiliated with other content providers having products, goods, services, webpages, etc. in that category (e.g., companies other than company A), limiting exposure of the B profile 505 to a single target webpage 503 in a particular category can help determine (i) whether first party data leakage is occurring and, (ii) if first party data leakage is occurring, the source of the data leakage.

Once the B profile is generated, its data (e.g., first party data) is shared with one or more intermediaries 507 (referred to hereinafter as "intermediary 507"). As explained elsewhere herein, in practice the data is shared with the intermediary 507 to enable the intermediary to target the B profile with advertisement content of the original content provider. The intermediary can include an advertisement agency (e.g., an advertisement trading desk), advertiser advertisement server, data management platform, customer data platform, demand side partner (DSP), advertisement exchange, data exchange, advertisement network, supply side platform, publisher advertisement server, or other parties that facilitate exchange of content from content providers to third-party websites. In some embodiments, the intermediary 507 has a contractual relationship with the original content provider associated with the target webpage 503, such that the intermediary 507 has an obligation to target users with advertisement content of the original content provider. In some embodiments, there may be a chain of intermediaries between the original content provider and the third-party webpage on which the advertisement is served.

In some embodiments, the data associated with the B profile 505 is provided to only a limited number of the pool of intermediaries. That is, the data is not provided to all of the intermediaries. As explained in more detail herein, providing this data to only a limited number of the intermediaries allows for detection of first-party data leakage, and also facilitates identification of the source of such data leakage.

After providing the data to the intermediary 507, the B profile 505 is then provided (e.g., directed or exposed) to one or more third-party webpages 509 (referred to hereinafter as "third-party webpage 509") having at least one advertisement slot 510 thereon. The third-party webpage 509 can be any webpage not (i) controlled by the original content provider of the target webpage 503; (ii) hosted by the same web server (i.e., server A) as the target webpage 503, and/or (iii) in the same category of the target webpage 503. For example, if the target webpage 503 is in the auto category, the third-party webpage 509 the B profile is exposed to is not in the auto category. Additionally, the third-party webpage does not include the target webpage 503. In some embodiments, providing the B profile 505 to the third-party webpage 509 can occur repeatedly. For example, the B profile 505 can be exposed to the third-party webpage 509 for a certain duration (e.g., 1 hour, 2 hours, 3 hours, 4 hours, 5 hours, 6 hours, 12 hours, 1 day, 2 days, 3 days, 4 days, 1 week, 2 weeks, or any time therebetween) and/or at a particular frequency (e.g., every 1 hour, 2 hours, 3 hours, 4 hours, 5 hours, 6 hours, 12 hours, 1 days, etc.).

As described elsewhere herein (e.g., with reference to FIG. 3), the third-party webpage 509 typically utilizes one or more intermediaries to sell rights to the advertisement slot 510 for each user visit to the third-party webpage 509. As also described elsewhere herein, these one or more intermediaries will be provided the first party data associated with the B profile 505 and attempt to provide advertisement content in the advertisement slot 510 based on the B profile 505 (i.e., a synthetic user). Additionally, the one or more intermediaries will attempt to maximize revenue for the advertisement slot 510 by offering, selling, or providing the advertisement slot 510 to the content provider most interested in targeting the user with its advertisement content. Because the first party data of the B profile 505 was provided to the intermediary 507, the intermediary 507 may provide to the advertisement slot 510 advertisement content of the original content provider associated with the target webpage 503. In other embodiments, however, the intermediary 507 may intentionally leak the first party data and provide the advertisement slot 510 directly or indirectly to competitors of the original content provider, intermediaries associated with the competitors, or other content providers interested in the first party data. Although FIG. 5 illustrates a single intermediary 507 that receives the B profile data and provides advertisement content for the advertisement slot 510 of the third-party webpage 509, in some embodiments there may be a chain of two or more intermediaries. For example, a first intermediary may receive the B profile data, which may in turn be provided to another intermediary that supplies advertisement content for the advertisement slot 510. In practice, there may be many multiples of such intermediaries.

The above-described operations of FIG. 5 generally correspond to a single B profile being provided to the intermediary 507 and the third-party webpage 509. However, the above-described operations can be conducted multiple times using a plurality of B profiles. That is, different B profiles that each have first party data corresponding to the target webpage 503 can be generated and provided to the intermediary 507. The B profiles can then be exposed to a variety of third-party webpages 509 having advertisement slots 510 thereon. In doing so, the system 500 can gather additional data related to whether the intermediary 507 has leaked the first party data of the original content provider to other content providers.

Additionally or alternatively to the above-described operations of FIG. 5, in some embodiments the A profile 501 may likewise be exposed or directed to one or more third-party webpages 509, e.g., via a parallel process. At the third-party webpage 509, the advertisement slot 510 may be filled by advertisement content displayed to the A profile 501 or the synthetic users associated therewith. Because the A profile 501 has not been exposed to the target webpage 503 (in contrast to the B profiles), they may serve as a baseline for comparison with respect to the particular advertisement content provided via the advertisement slot 510 of the third-party webpage 509. For example, if the A and B profiles 501, 503 are shown substantially similar or identical advertisements via the third-party webpage 509, then there is no indication that the first-party data associated with the target webpage 503 has necessarily been leaked. In contrast, if the advertisement content provided to the A and B profiles 501, 503 differ, then the difference may indicate leakage of first-party data associated with the target webpage 503, in particular if the advertisement content served to the B profile 505 is related to competitors, industry peers of the target webpage 503, or content providers within the same category as the target webpage 503. As one example, if the target webpage 503 is associated with Ford®, then the presence of advertisements for Chevrolet® on the third-party webpage 509 presented to the B profile 505 (but not presented to A profile 501 visitors) may indicate that the first-party data associated with Ford's target webpage 503 has been leaked by the intermediary 507 or another associated entity.

In some embodiments, the A profile 501 may not be directed to the third-party webpage 509, and instead analysis of the advertisement content served to the B profile 505 may itself suffice to detect data leakage via the intermediary 507 or another associated entity. That is, data leakage via the intermediary 507 may be determined via the B profile 505 without considering the A profile 501.

Data associated with the advertisement content provided via the third-party webpage 509 is retrieved by or provided to a content monitor 511. The content monitor 511 can correspond to the content monitor 400 previously described, and may include similar or identical components and/or features. As shown in FIG. 5, the content monitor 511 includes a content analyzer 512 and a report generator 513. The content analyzer 512 can include similar or identical features to those of content analyzer 405 (FIG. 4), and the report generator 513 can include similar or identical features to those of the report generator 407 (FIG. 4). The content analyzer 512 is configured to analyze the retrieved data of the third-party webpage 509, including the advertisement content that was provided thereon to each of the A profiles 501 and B profiles 505. For example, the content analyzer 512 can (i) categorize the advertisement content into one of the categories of goods or services previously described, and/or (ii) determine whether the advertisement content corresponds to the original content provider of the target webpage 503. Additionally, in some embodiments the content analyzer 512 can determine whether the advertisement content corresponds to a different content provider (i.e., not the original content provider), including one in the same category of goods or services (e.g., the auto category). That is, the content analyzer 512 can determine whether the advertisement content provided to the B profile when visiting the third-party webpage 509 corresponds to competitors of the original content provider or other content providers interested in the B profile's interaction with the target webpage 503. In such embodiments, if the content analyzer 512 determines that the retrieved advertisement content corresponds to a different content provider within the same category of goods or services, the content analyzer 512 may determine that the first party data has been leaked. Additionally, in such embodiments, the content analyzer 512 may also determine that the first party data has been leaked via the intermediary 507. Alternatively, if the content analyzer 512 determines that the retrieved advertisement content does not correspond to a different content provider within the same category of goods and services as the original content provider, the content analyzer 512 may determine that the first party data has not been leaked.

As noted previously, in some embodiments both the A profile 501 and B profile 505 may be exposed to the third-party webpage 509. The content monitor 511 can collect data regarding which advertisement content was displayed to which profiles, and the content analyzer 512 may analyze the collected and/or aggregate data to determine whether any discrepancies exist and if such discrepancies indicate data leakage. For example, the prevalence of certain advertisement content presented to the A profile 501 may provide a baseline against which the B profile 505 is compared. If, compared to the A profile 501, the B profile 505 is shown substantially different advertisement content, then data leakage may be indicated. This may be particularly true if the B profile 505 is served an increased number of advertisement content in one or more categories associated with the target webpage 503, but which are not directly associated with the target webpage 503. For example, if the target webpage 503 is associated with Delta® airlines, and, as compared to the A profiles, the B profiles are shown a much higher number of advertisements from non-Delta airlines, then the content analyzer 512 may indicate that Delta's first-party data has likely been leaked via one or more intermediaries.

The report generator 513 is configured to generate one or more reports based on analysis or output signals from the content analyzer 512 and/or the retrieved data or content of the third-party webpage 509. For example, as previously described, if the content analyzer 512 determines that the first party data has been leaked, the report generator 513 may automatically generate a report or indication (e.g., an email, text message, phone call, etc.) to be sent to one or more recipients indicating such. Additionally, if the content analyzer 512 determines that the first party data has been leaked via the intermediary 507, the report generator 513 may automatically generate a report or indication to be sent to one or more recipients indicating such.

FIG. 6 is a flow diagram illustrating a process 600 for detecting and/or inhibiting data leakage, in accordance with embodiments of the present technology. As shown in FIG. 6, the process 600 includes generating synthetic-user profiles (process portion 602). As explained elsewhere herein, each of the synthetic-user profiles can emulate a user or target audience member that visits the website of a content provider. The process 600 further includes providing or exposing the synthetic-user profiles to one or more predetermined websites (e.g., the target webpage 503; FIG. 5) to create category profiles (process portion 604). The predetermined websites can include one or more webpages corresponding to products or services of the original content provider, as previously described. The category profiles can generally correspond to the B profiles described elsewhere herein. Exposing the synthetic-user profiles can include providing or directing the synthetic-user profiles to the predetermined website such that content or data for the predetermined website becomes incorporated into the generated category profiles. In some embodiments, the category profiles will only be exposed to websites within a particular category of goods and services that correspond to the original content provider. That is, if the original content provider operates in category "A," the category will not be exposed to other websites that operate in category A. For example, the category profile is exposed to only the web site(s) of company "A," but not those of company A's competitors that operate in the same category or industry. As explained elsewhere herein, exposing the category profiles to websites of just a single party or content provider in a particular category can help identify whether data leakage has occurred.

The process 600 further includes providing data associated with the exposure to one or more intermediaries (process portion 606). In doing so, the one or more intermediaries are made aware that the category profiles, which correspond to different users, each have visited the predetermined website. Stated differently, the one or more intermediaries become privy to the original content provider's first party data that only the original content provider has. Accordingly, the one or more intermediaries know that the category profiles are seemingly interested in goods or services of the original content provider. Providing the data can include providing the data only to a limited subset of the overall group of intermediaries. That is, the data is not provided to the entire group of intermediaries, since doing so would inhibit the ability to determine whether data leakage has occurred. Accordingly, the data is provided only to a single intermediary or a group of intermediaries.

The process 600 further includes providing or exposing the category profiles to third-party websites having advertisements slots (process portion 608). The third-party websites can include websites (i) controlled by an entity other than the entity controlling the predetermined web site; (ii) hosted by a different web server than that of the predetermined web site, and/or (iii) other than the predetermined website or websites corresponding to the same goods or services of the predetermined website's content provider (i.e., the original content provider). Accordingly, the third-party websites are not in the category associated with the predetermined website's content provider, since doing so would inhibit the ability to determine whether data leakage has occurred. In some embodiments, providing or exposing the category profiles to the third-party websites can occur repeatedly. For example, the category profiles can be exposed to the third-party websites for a certain duration (e.g., 1 hour, 2 hours, 3 hours, 4 hours, 5 hours, 6 hours, 12 hours, 1 day, 2 days, 3 days, 4 days, 1 week, or any time therebetween) and/or at a particular frequency (e.g., every 1 hour, 2 hours, 3 hours, 4 hours, 5 hours, 6 hours, 12 hours, 1 days, etc.).

The process 600 further includes retrieving data corresponding to advertisement content on the third-party websites that were provided to the category profiles (process portion 610). The retrieved data can include details on the advertisement content, including (i) the category of goods or services that the advertisement contents corresponds to, (ii) the content provider of the advertisement content, and/or (iii) the intermediary that supplied the advertisement content. The data can correspond to cookies, web-beacons, user-agent strings, referrer headers, combinations thereof, or other metadata associated with and extractable via the third-party websites.

The process 600 further includes determining whether data leakage occurred, based on the retrieved data (process portion 612). Data leakage can refer to media arbitrage, as described elsewhere herein, and/or the first party data being improperly shared with a third-party, such as content providers other than the original content providers. Accordingly, determining whether data leakage occurred can include determining whether first party data of the original content provider (e.g., company A) was shared, e.g., via the one or more intermediaries, to a third party operating in the same category of goods or services as the original content provider. If first party data was leaked to such a third party, the retrieved data, which corresponds to the advertisement content provided to the category profiles when they visited the third-party websites, would include advertisement content corresponding to content providers that operate in the same category of goods or services as the original content provider (e.g., company A). For example, if company A is the Ford Motor Company®, and the retrieved data corresponds to advertisement content for one or more of Chevrolet®, Dodge®, Nissan®, etc., then data leakage is likely to have occurred. Additionally, the source of data leakage can likely be attributed the one or more intermediaries because the first party data was only provided to them. In some embodiments, determining whether data leakage occurred may depend on whether the relative amount of advertisement content corresponding to the content providers that do not own the first party data and operate in the same category is above a predetermined threshold (e.g., 10%, 20%, 30%, 40%, 50%, 60%, 70%, 80%, 90%, or any number therebetween). For example, per process 600, data leakage may be determined to have occurred if at least 40% of the advertisement content provided to the category profiles corresponds to content providers, other than the original content provider, that operate in the same category as the original content provider and is above a predetermined threshold.

FIG. 7 is a flow diagram illustrating a process 700 for detecting and/or inhibiting data leakage, in accordance with embodiments of the present technology. The process 700 can include many similarities to those of process 600 previously described. As shown in FIG. 7, process 700 includes generating synthetic-user profiles including a first group and a second group (process portion 702). The first group is exposed to a predetermined website to create category profiles (process portion 704). Process portion 704 can include similar or identical features to process portion 604. The second group is not exposed to the predetermined website or, optionally, to any other website associated with the category of goods or services of the predetermined website. Accordingly, the original content provider of the predetermined web site has first party data corresponding to each of the generated category profiles for their visit to the predetermined web site. Additionally, the original content provider does not have first party data corresponding to the second group, which was not exposed to the predetermined website.

Process 700 further includes providing data associated with the exposure of the first group to one or more intermediaries (process portion 706), exposing the category profiles and the second group of synthetic-user profiles to third-party websites (process portion 708), and retrieving data correspond to advertisement content on the third-party websites received by the category profiles and the second group of synthetic-user profiles (process portion 710). Process portions 706, 708, 710 can include similar or identical features to those of process portions 606, 608, 610, respectively.

Process 700 further includes determining whether data leakage occurred, based on the retrieved data (process portion 712). Process portion 712 can include similar or identical features to those of process portion 612. Accordingly, determining whether data leakage occurred can include determining whether first party data associated with the category profiles was shared, e.g., via the one or more intermediaries, to a third-party content provider operating in the same category of goods or services as the original content provider. Additionally, determining whether data leakage occurred can include comparing (i) the retrieved data corresponding to the advertisement content on the third-party websites received by the category profiles with (ii) the retrieved data corresponding to the advertisement content on the third-party websites received by the second group of synthetic-user profiles. If, for example, the retrieved data corresponding to the category profiles, relative to the retrieved data corresponding to the second group, includes more (e.g., 10% more, 20% more, 30% more, 40% more, 50% more, 60% more, 70% more, 80% more, 90% more, 100% more, 150% more, 200% more, 300% more, or any number therebetween) advertisement content for content providers that operate in the same category of goods or services as the original content provider, then data leakage is likely to have occurred. Stated differently, the advertisement content received by second group when visiting the third-party web sites can serve as a "control group" for determining whether data leakage occurred via the one or more intermediaries. If the advertisement content received by the category profiles when visiting the third-party websites is (i) more than that received by the second group and (ii) provided by content providers affiliated with the same category or a related category as that of the original content provider, then data leakage likely occurred. Additionally, if the one or more intermediaries were the only group other than the original content provider that was privy to the first party data associated with the category profiles, then the one or more intermediaries likely is at least partially responsible for the data leakage.

An advantage of embodiments of the present technology is that original content providers can determine and prove whether data leakage (e.g., of first party data) has occurred. As described elsewhere herein, original content providers have previously been unable to definitively determine whether data leakage was occurring because the platform to prove such leakage did not exist. That is, the ability to test whether a group of intermediaries leaked first party data that only they were privy to did not exist. As such, original content providers who suspected that data leakage was occurring still could not prove that the data was being inappropriately leaked, and that the data was being inappropriately leaked by one or more intermediaries. Embodiments of the present technology address these issues at least in part. As described elsewhere herein, the one or more intermediaries often engage in contractual agreements with the original content providers that are meant to contractually limit the intermediaries' ability to share data (e.g., first party data) provided from the original content providers to the intermediaries. Accordingly, by enabling the original content providers to determine (i) whether data leakage occurred and (ii) the source of the data leakage, the original content providers can now enforce the agreements with the one or more intermediaries to hold them accountable. As a result, embodiments of the present technology enable the original content providers to inhibit data leakage from occurring via these intermediaries, thereby making the advertising efforts of the original content providers more effective and overall less costly.

Figure 8A:
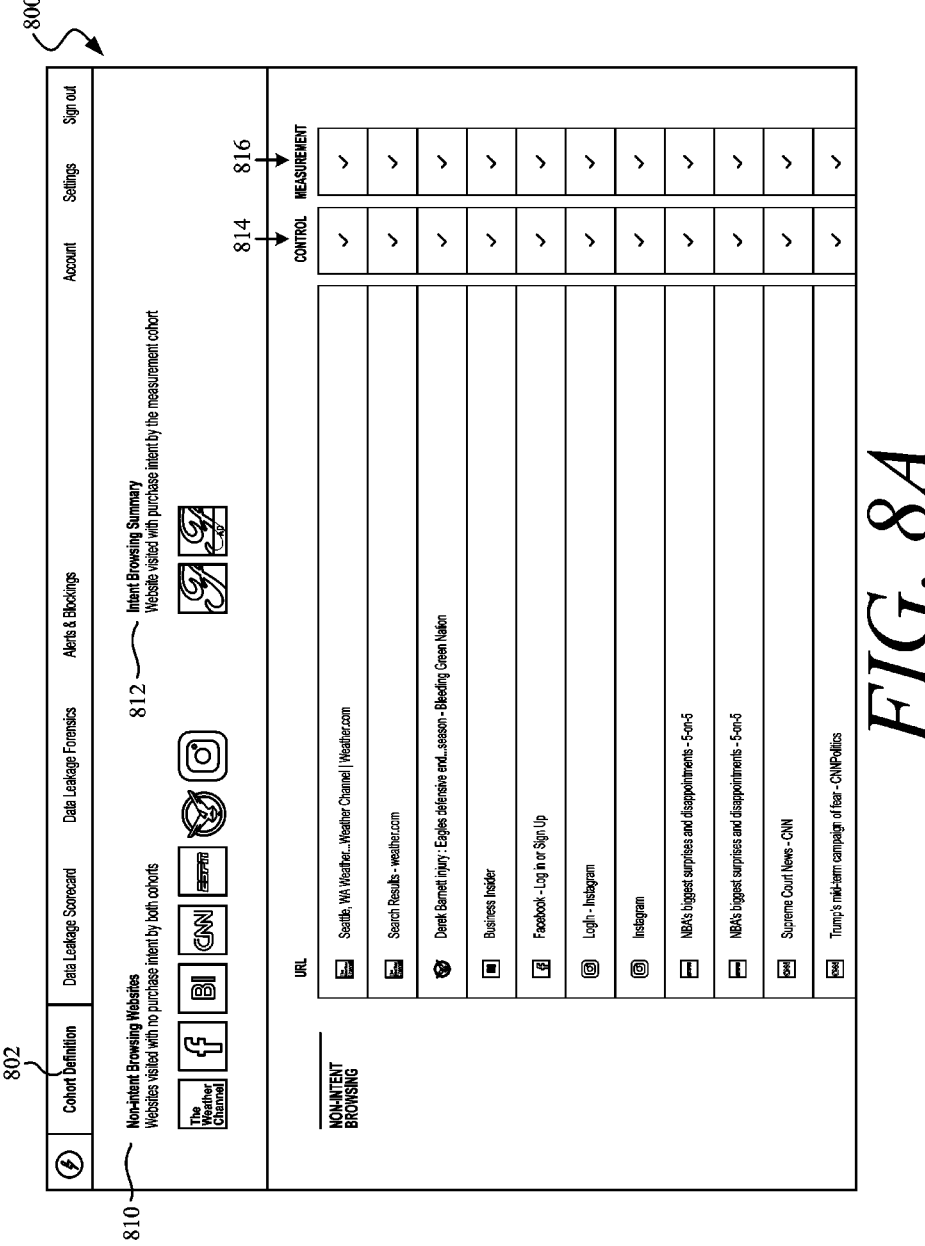
Figure 8B:
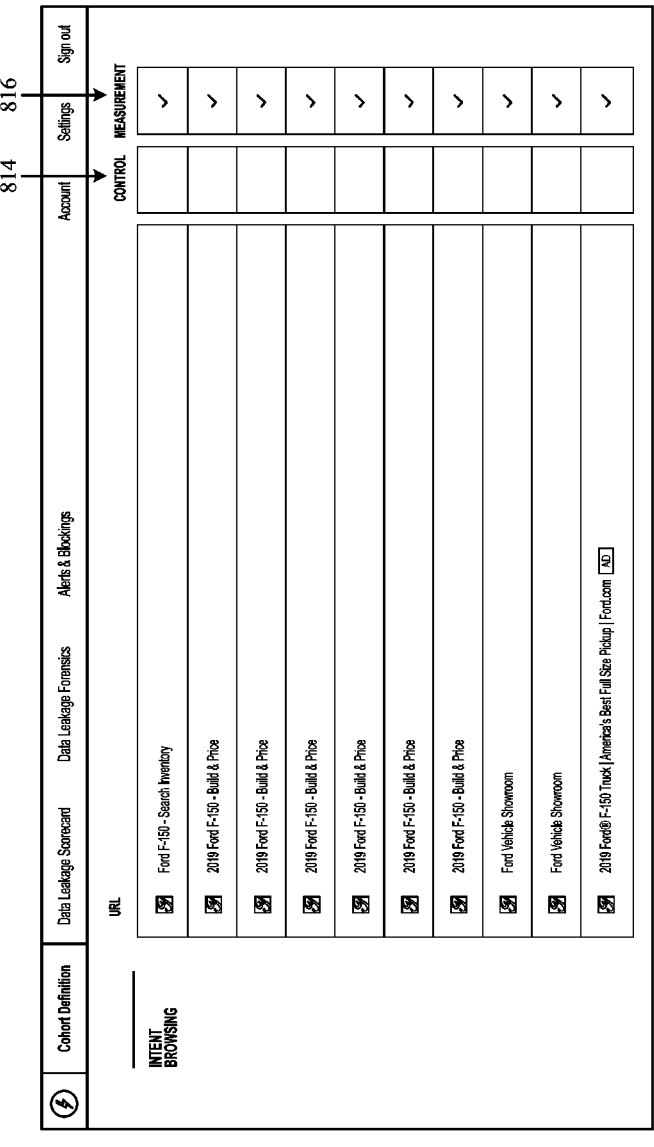

FIGS. 8A-8C are illustrations of user interfaces 800 (referred to as "interface 800"), in accordance with embodiments of the present technology. FIG. 8A is an illustration of a cohort definition page 802 of the interface 800. As shown in FIG. 8A, the cohort definition page 802 includes a set of non-intent browsing websites 810 (e.g., websites associated with the Weather Channel®, Facebook®, Business Insider®, CNN®, ESPN®, etc.) and a set of intent browsing websites 812 (e.g., websites associated with Ford®). The non-intent browsing websites 810 can correspond to the websites used to build or generate the synthetic-user profiles, as described elsewhere herein (e.g., with reference to FIGS. 2-5), and the intent browsing websites 812 can correspond to the website(s) used to generate tailored profiles (e.g., the B profiles described with reference to FIG. 5 and/or the category profiles described with reference to FIGS. 6 and 7) that have first party data associated therewith. As shown in FIGS. 8A and 8B, the intent browsing websites 810 are included in only the measurement group 816, and the non-intent browsing websites 812 are included in both the measurement group 816 and the control group 814. That is, the measurement group 816 includes the intent browsing websites 810 and the non-intent browsing websites 812 as part of its browsing history, and the control group 814 only includes the non-intent browsing websites 812 (i.e., not the intent browsing websites 810). As such, the control group 814 can correspond to the general synthetic-user profiles previously described, and the measurement group 816 can correspond to the tailored profiles (e.g., the B profiles and/or category profiles) having corresponding first party data associated therewith, as previously described. As shown in FIGS. 8A and 8B, the checkmarks for the control and measurement groups 814, 816 indicate the websites that are included, e.g., as browsing history, in the control and measurement groups 814, 816.

FIG. 8C is an illustration of a data leakage scorecard page 804 of the interface 800. The data leakage scorecard page 802 provides for the user (e.g., the original content provider) real-time data corresponding to advertisement content that has been provided to the control and measurements groups 814, 816. As shown in FIG. 8C, the data leakage scorecard page 804 indicates the category 818 that the advertisement content corresponds to, and a comparison or change 820 of advertisement content of the control and measurements groups 814, 816 for each content provider of each category 818. The values of the control and measurement groups 814, 816 represent the percentage of overall advertisement content that was (i) attributed to a particular content provider (e.g., Ford®, Kia®, etc.) and (ii) provided to the individual control and measurement groups 814, 816. For example, the advertisement content where Ford® was the content provider constituted 1% of all advertisement content that was provided to the control group, and 12% of all advertisement content that was provided to the measurement group. The values in the change 820 column correspond to the difference between the values of the control and measurement groups 814, 816.

For the embodiment illustrated in FIG. 8C, Ford® is the original content provider, as indicated by the intent browsing websites 812 shown in FIG. 8B. The data leakage scorecard page 802 includes "Auto" as one of the categories, and different content providers (e.g., Kia®, Chevrolet®, Toyota®, Dodge®, and Nissan®) as part of the auto category. The data leakage scorecard page 802 also includes other related categories (e.g., insurance), as well as seemingly unrelated categories (e.g., e-commerce, telecom, tech, travel, and consumer packaged goods (CPG)). The categories 818 and the content providers for each category can be automatically populated, e.g., by the content monitor 511 (FIG. 5), based on the advertisement content provided to the control and measurement groups 814, 816. That is, individual categories and corresponding content providers are automatically added to the data leakage scorecard page 802 after the corresponding advertisement content is shown to at least one of the control and measurement groups 814, 816. As such, the content monitor 511 or other components can automatically categorize advertisement content according to category and its content provider, as explained elsewhere herein.

As shown in FIG. 8C for the auto category, the advertisement content that was provided to each of the control and measurement groups 814, 816 varied significantly. For example, the advertisement content where Ford® was the content provider constituted 1% of all advertisement content that was provided to the control group, and 12% of all advertisement content that was provided to the measurement group, which is a 1200% change. Such a large change can indicate that the one or more intermediaries that provided the advertisement content to the control and measurement groups 814, 816 considered the first party data they were provided to target the measurement group 816 (i.e., tailored synthetic users). Additionally, though, the relatively large changes for the other auto content providers indicate that the same one or more intermediaries also used the first party data to target the measurement groups 816 with advertisement content from the other auto content providers. For example, the change in advertisement content provided to the control and measurement groups 814, 816 was 900% for Kia®, 400% for Chevrolet®, 700% for Toyota®, 400% for Dodge®, and 200% for Nissan®. Accordingly, one could conclude that data leakage, e.g., from the one or more intermediaries, occurred. If data leakage did not occur, the advertisement content that was provided to each of the control and measurement groups would be similar (e.g., less than 100% change, less than 50% change, or any percentage value therebetween), as the one or more intermediaries would not know that the measurement group is more interested in the auto category than the control group, and thus would not target them.

As also shown in FIG. 8C, the insurance category also includes a significant variation in the advertisement content that was provided to each of the control and measurement groups 814, 816, with the amount of advertisement content being 263% greater for the measurement group 816 than the control group 814. This large difference may also indicate data leakage, because content providers in the insurance category would seemingly also be interested in those users with first party data associated with the auto category. Also noteworthy is the fact that other categories (e.g., e-commerce, telecom, tech, travel, CPG) did not experience an increase in advertisement content shown to the measurement group 816. This result is expected since content providers of these categories would not be interested in targeting a user with a browsing history that includes the auto category. Accordingly, these differences in advertisement content between the measurement and control groups 814, 816 provide further evidence that the one or more intermediaries leaked Ford's first party data to other content providers.

CONCLUSION

Although many of the embodiments are described above with respect to systems, devices, and methods for detecting and/or inhibiting data leakage, the technology is applicable to other applications and/or other approaches as well. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-8C.

The above detailed descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A method for monitoring and/or inhibiting data leakage of online content, comprising: generating a plurality of first profiles; providing the first profiles to a predetermined website to create second profiles from the first profiles, wherein the predetermined website is characterized within a content category; providing data associated with the exposure of the first profiles to one or more intermediaries; after providing the data to the one or more intermediaries, providing the second profiles to third-party web sites such that content of the third-party web sites is received by the second profiles;

retrieving data corresponding to the content received by the second profiles via the third-party web sites; and based on the retrieved data, determining whether data leakage occurred via at least one of the one or more intermediaries.

2. The method of any of the previous examples, wherein the content is dynamic content, the first profiles are synthetic-user profiles, and the second profiles are category profiles.

3. The method of any one of the previous examples, wherein determining whether data leakage occurred comprises determining whether the retrieved data corresponds to dynamic content associated with the content category the predetermined website is characterized within.

4. The method of any of the previous examples, wherein the predetermined website is associated with a first content provider or hosted by a first server, and wherein determining whether data leakage occurred comprises determining whether the retrieved data corresponds to dynamic content (i) associated with a second content provider or hosted by a second server, and (ii) associated with the content category the predetermined website is characterized within.

5. The method of example 4, further comprising, if the retrieved data corresponds to dynamic content associated with (i) a second content provider and (ii) the content category the predetermined website characterized within, then generating an indication that data leakage has occurred.

6. The method of any of the previous examples, wherein providing data to the one or more intermediaries comprises providing at least one of a cookie, web beacon, user-agent string or referer header associated with the exposure to the predetermined website.

7. The method of any of the previous examples, wherein the content category is one of a plurality of content categories, the method further comprising:

characterizing individual content of the third-party web-sites as one of the plurality of content categories, wherein the content categories include at least two of auto, travel, healthcare, hospitality, insurance, telecommunications, online retail or financial services.

8. The method of any one of the previous examples, wherein providing the second profiles includes repeatedly providing the second profiles to the third-party websites for a predetermined duration of time at a predetermined frequency, wherein the third-party web-sites are not characterized to be within the content category.

9. A method for monitoring and/or inhibiting data leakage related to online content, comprising:

generating a plurality of synthetic-user profiles including a first group and a second group;

exposing the first group of the synthetic-user profiles to a predetermined web site, wherein the predetermined website is characterized within a content category;

providing data associated with the exposure of the first group to one or more intermediaries;

after providing the data to the one or more intermediaries, exposing the synthetic-user profiles to third-party web-sites such that dynamic content of the third-party websites are received by the first and second groups of the synthetic-user profiles;

retrieving information corresponding to the dynamic content of the third-party websites; and based on the retrieved information, determining whether data leakage occurred via at least one of the one or more intermediaries.

10. The method of any one of the previous examples wherein (i) the dynamic content of the third-party websites received by the first group comprises first dynamic content, (ii) the dynamic content of the third-party websites received by the second group comprises second dynamic content, and (iii) the predetermined website is associated with a first content provider, and wherein determining whether data leakage occurred comprises determining whether the first dynamic content is (i) in the content category and (ii) associated with a content provider other than the first content provider.

11. The method of example 10, wherein if the first dynamic content is (i) in the content category and (ii) associated with a second content provider different than the first content provider, then generating an indication that data leakage via at least one of the one or more intermediaries occurred.

12. The method of any one of the previous examples, wherein determining whether data leakage occurred comprises comparing the first dynamic content to the second dynamic content.

13. The method of example 12, further comprising:

based on the comparison of the first and second dynamic content, generating a report including a likelihood of data leakage; and displaying the report to a user via a display unit.

14. The method of any one of the previous examples, wherein (a) the dynamic content of the third-party websites received by the first group comprises first dynamic content and (b) the dynamic content of the third-party web sites received by the second group comprises second dynamic content, and wherein determining whether data leakage occurred comprises:

determining whether the first dynamic content is in the content category;

determining whether the second dynamic content is in the content category;

if (a) the first dynamic content is in the content category and (b) the second dynamic content is not in the content category, then generating an indication that data leakage via at least one of the one or more intermediaries occurred.

15. The method of any one of the previous examples, wherein (a) the dynamic content of the third-party websites received by the first group comprises first dynamic content and (b) the dynamic content of the third-party websites received by the second group comprise second dynamic content, and wherein determining whether data leakage occurred comprises:

determining whether the first dynamic content is in the content category;

determining whether the second dynamic content is in the content category;

if (a) the first dynamic content is in the content category and not associated with the predetermined website, and (b) the second dynamic content is not in the content category, then generating an indication that data leakage occurred via at least one of the one or more intermediaries.

16. The method of any one of the previous examples, wherein the synthetic-user profiles have profile characteristics, and wherein the first and second groups have similar or identical profile characteristics prior to exposing the first group of the synthetic-user profiles to the predetermined website.

17. The method of any one of the previous examples, further comprising not exposing the second group to the predetermined website.

18. The method of any one of the previous examples, wherein the content category is one of a plurality of content categories, the method further comprising:

characterizing individual dynamic content of the third-party web sites as one of the plurality of content categories, wherein the content categories include at least two of auto, travel, healthcare, hospitality, insurance, telecommunications, online retail or financial services.

19. The method of any one of the previous examples, wherein the one or more intermediaries includes a first intermediary and a second intermediary, and wherein providing data comprises providing data associated with the exposure of the first group to the first intermediary, the method further comprising exposing the first group to the second intermediary, wherein determining whether data leakage occurred includes determining whether data leakage occurred via (a) the first intermediary, (b) the second intermediary, or (c) the first and second intermediaries.

20. The method of any one of the previous examples, wherein the one or more intermediaries comprises a content agency, content server, content exchange, content network, data exchange, data management platform, customer data platform, supply side platform or demand side partner (DSP).

21. The method of any one of the previous examples, wherein exposing the synthetic-user profiles comprises exposing the first and second groups to third-party websites not characterized within the content category.

22. The method of any one of the previous examples, wherein exposing the synthetic-user profiles includes repeatedly exposing the first and second groups to third-party websites not characterized within the content category for a duration of at least 12 hours at a frequency of at least once per hour.

23. The method of any one of the previous examples, wherein the operations of (a) exposing the synthetic-user profiles to third-party websites, (b) retrieving information corresponding to the dynamic content, and (c) determining whether data leakage occurred, are iteratively performed for a duration of at least 12 hours at a frequency of at least once per hour.

24. The method of any one of the previous examples, wherein exposing the first group of the synthetic-user profiles to a predetermined website comprises exposing only the first group, and not the second group, of synthetic-user profiles to the predetermined website by causing the first group to perform a plurality of activities on the predetermined web site.

25. The method of any one of the previous examples, wherein generating the plurality of synthetic-user profiles includes retrieving resources from a plurality of external websites, the resources including user-specific content configured to identify individual synthetic-user profiles.

26. The method of any one of the previous examples, wherein:

the third-party web sites include internal content hosted by a target web server, the dynamic content of the third-party websites received by the first group comprises first dynamic content, the dynamic content of the third-party websites received by the second group comprises second dynamic content, the first and second dynamic content of the third-party websites are hosted by an affiliated web server different than the target web server, and the first and second dynamic content of the third-party websites are based on individual synthetic-user profiles.

27. The method of any one of the previous examples, wherein generating the plurality of synthetic-user profiles comprises:

retrieving, via a browser, user-specific data including cookies from predetermined or pseudo-random external websites;

accumulating the user-specific data from the predetermined or pseudo-random external web sites; and exposing individual synthetic-user profiles to the accumulated user-specific data.

28. The method of any one of the previous examples, wherein determining whether data leakage occurred comprises comparing the first dynamic content received by the first group with the second dynamic content received by the second group.

29. The method of any one of the previous examples, wherein providing data to the one or more intermediaries comprises providing at least one of a cookie, web beacon, user-agent string or referer header associated with the predetermined website.

30. A tangible, non-transitory, computer-readable medium having instructions stored thereon that are executable by one or more processors to cause a computing device to perform the method of any one of examples 1-29.

31. A data protection platform configured to perform the method of any one of examples 1-29.

32. A system comprising a processor; and tangible, non-transitory, computer-readable media storing instructions executable by the processor to cause the system to perform the method of any one of examples 1-29.

The invention claimed is:

1. A method for detecting data leakage of online content, comprising:

generating a plurality of synthetic-user profiles including a first group and a second group;

exposing only the first group of the synthetic-user profiles to a predetermined website, provided by a first content provider operating in a first category;

providing first party data associated with the exposure of the first group to one or more intermediaries;

after providing the first party data to the one or more intermediaries, exposing the synthetic-user profiles to third-party websites such that dynamic content of the third-party websites are received by the first and second groups of the synthetic-user profiles, wherein the dynamic content of the third-party websites received by the first group comprises first dynamic content and wherein the dynamic content of the third-party websites received by the second group comprises second dynamic content;

retrieving data corresponding to the dynamic content of the third-party websites; and based on the retrieved data, determining whether data leakage occurred via at least one of the one or more intermediaries at least in part by, determining, from among the first dynamic content, a first percentage of dynamic content corresponding to content providers that do not own the first party data and that operate in the first category, including competitors of the first content provider, determining, from among the second dynamic content, a second percentage of dynamic content corresponding to content providers that do not own the first party data and that operate in the first category, including competitors of the first content provider, and determining a difference between the second percentage of dynamic content corresponding to content providers that do not own the first party data and that operate in the first category and the first percentage of dynamic content corresponding to content providers that do not own the first party data and that operate in the first category.

2. The method of claim 1, further comprising:

in response to determining that the first percentage or the second percentage exceeds a predetermined threshold, generating an indication that data leakage via at least one of the one or more intermediaries occurred.

3. The method of claim 1, wherein determining whether data leakage occurred comprises comparing the first dynamic content to the second dynamic content.

4. The method of claim 3, further comprising:

generating a report based on a comparison of the first and second dynamic content; and displaying the report to a user via a display unit.

5. The method of claim 1, wherein determining whether data leakage occurred comprises:

determining whether the first dynamic content is in the first category;

determining whether the second dynamic content is in the first category;

if (a) the first dynamic content is in the first category and (b) the second dynamic content is not in the first category, then generating an indication that data leakage via at least one of the one or more intermediaries occurred.

6. The method of claim 1, wherein the synthetic-user profiles have profile characteristics, and wherein the first and second groups have similar or identical profile characteristics except for exposing the first group of the synthetic-user profiles to the predetermined website.

7. The method of claim 1, further comprising not exposing the second group to the predetermined website.

8. The method of claim 1, wherein the first category is one of a plurality of content categories, the method further comprising:

characterizing the dynamic content of the third-party websites to be within one of the plurality of content categories, wherein the plurality of content categories include at least two of auto, travel, healthcare, hospitality, insurance, telecommunications, online retail or financial services.

9. The method of claim 1, wherein the one or more intermediaries comprises a content agency, content server, content exchange, content network, data exchange, data management platform, customer data platform, supply side platform and/or demand side partner (DSP).

10. The method of claim 1, wherein exposing the synthetic-user profiles includes repeatedly exposing the first and second groups to third-party websites not characterized to be within the first category for a duration of at least 12 hours at a predetermined frequency.

11. The method of claim 1, wherein:

the third-party websites include internal content hosted by a first web server, and the first and second dynamic content of the third-party websites are hosted by a second web server different than the first web server.

12. The method of claim 1, wherein the first category is the retail category, wherein the first content provider owns the first party data, wherein determining the first percentage comprises determining, from among the first dynamic content, a percentage of dynamic content corresponding to content providers, other than the first content provider, that operate in the retail category, and wherein determining the second percentage comprises determining, from among the second dynamic content, a percentage of dynamic content corresponding to content providers, other than the first content provider, that operate in the retail category.

13. A tangible, non-transitory computer-readable medium storing instructions that, when executed by one or more processors of a computing system cause the system to perform a method comprising:

generating a plurality of synthetic-user profiles including a first group and a second group;

exposing only the first group of the synthetic-user profiles to a predetermined website provided by a first content provider operating in a first category;

providing first party data associated with the exposure of the first group to one or more intermediaries;

after providing the first party data to the one or more intermediaries, exposing the synthetic-user profiles to third-party websites such that dynamic content of the third-party websites are received by the first and second groups of the synthetic-user profiles, wherein the dynamic content of the third-party websites received by the first group comprises first dynamic content and wherein the dynamic content of the third-party websites received by the second group comprises second dynamic content;

retrieving data corresponding to the dynamic content of the third-party websites; and based on the retrieved data, determining whether data leakage occurred via at least one of the one or more intermediaries at least in part by, determining, from among the first dynamic content, a first percentage of dynamic content corresponding to content providers that do not own the first party data and that operate in the first category, including competitors of the first content provider, determining, from among the second dynamic content, a second percentage of dynamic content corresponding to content providers that do not own the first party data and that operate in the first category, including competitors of the first content provider, and determining a difference between the second percentage of dynamic content corresponding to content providers that do not own the first party data and that operate in the first category and the first percentage of dynamic content corresponding to content providers that do not own the first party data and that operate in the first category.

14. The computer-readable medium of claim 13, further comprising:

generating an indication that data leakage via at least one of the one or more intermediaries occurred.

15. The computer-readable medium of claim 13, wherein determining whether data leakage occurred comprises comparing the first dynamic content to the second dynamic content.

16. The computer-readable medium of claim 15, further comprising:

generating a report based on a comparison of the first and second dynamic content; and displaying the report to a user via a display unit.

17. The computer-readable medium of claim 13, wherein determining whether data leakage occurred comprises:

determining whether the first dynamic content is in the first category;

determining whether the second dynamic content is in the first category;

if (a) the first dynamic content is in the first category and (b) the second dynamic content is not in the first category, then generating an indication that data leakage via at least one of the one or more intermediaries occurred.

18. The computer-readable medium of claim 13, wherein the synthetic-user profiles have profile characteristics, and wherein the first and second groups have similar or identical profile characteristics prior to exposing the first group of the synthetic-user profiles to the predetermined website.

19. The computer-readable medium of claim 13, the method further comprising not exposing the second group to the predetermined website.

20. The computer-readable medium of claim 13, wherein the determined difference comprises a percentage change from the second percentage of dynamic content corresponding to content providers that do not own the first party data and that operate in the first category to the first percentage of dynamic content corresponding to content providers that do not own the first party data and that operate in the first category.

21. A computing system for detecting data leakage of online content, the computing system comprising:

one or more processors;

one or more memories;

a first component, comprising computer-executable instructions stored in the one or more memories for execution by the computing system, configured to generate a plurality of synthetic-user profiles including a first group and a second group;

a second component, comprising computer-executable instructions stored in the one or more memories for execution by the computing system, configured to expose only the first group of the synthetic-user profiles to a predetermined website provided by a first content provider operating in a first category;

a third component, comprising computer-executable instructions stored in the one or more memories for execution by the computing system, configured to provide first party data associated with the exposure of the first group to one or more intermediaries;

a fourth component, comprising computer-executable instructions stored in the one or more memories for execution by the computing system, configured to expose the synthetic-user profiles to third-party websites such that dynamic content of the third-party websites are received by the first and second groups of the synthetic-user profiles, wherein the dynamic content of the third-party websites received by the first group comprises first dynamic content and wherein the dynamic content of the third-party websites received by the second group comprises second dynamic content;

a fifth component, comprising computer-executable instructions stored in the one or more memories for execution by the computing system, configured to retrieve data corresponding to the dynamic content of the third-party websites; and a sixth component, comprising computer-executable instructions stored in the one or more memories for execution by the computing system, configured to determine whether data leakage occurred via at least one of the one or more intermediaries at least in part by, determining, from among the first dynamic content, a first percentage of dynamic content corresponding to content providers that do not own the first party data and that operate in the first category, including competitors of the first content provider, determining, from among the second dynamic content, a second percentage of dynamic content corresponding to content providers that do not own the first party data and that operate in the first category, including competitors of the first content provider, and determining a difference between the second percentage of dynamic content corresponding to content providers that do not own the first party data and that operate in the first category and the first percentage of dynamic content corresponding to content providers that do not own the first party data and that operate in the first category.

22. The computing system of claim 21, further comprising:

in response to determining that the first percentage exceeds a predetermined threshold, generating an indication that data leakage via at least one of the one or more intermediaries occurred.

* * * * *